United States Patent
Fleissner et al.

(10) Patent No.: US 11,137,300 B2
(45) Date of Patent: Oct. 5, 2021

(54) ROBOTIC FORCE/TORQUE SENSOR WITH IMPROVED TEMPERATURE COMPENSATION

(71) Applicant: ATI Industrial Automation, Inc., Apex, NC (US)

(72) Inventors: David Fleissner, Cary, NC (US); Andrew Glusiec, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 124 days.

(21) Appl. No.: 16/608,390

(22) PCT Filed: Apr. 25, 2018

(86) PCT No.: PCT/US2018/029351
§ 371 (c)(1),
(2) Date: Oct. 25, 2019

(87) PCT Pub. No.: WO2018/200668
PCT Pub. Date: Nov. 1, 2018

(65) Prior Publication Data
US 2020/0191665 A1    Jun. 18, 2020

Related U.S. Application Data

(60) Provisional application No. 62/489,525, filed on Apr. 25, 2017.

(51) Int. Cl.
*G01L 1/22*     (2006.01)
*G01L 19/04*    (2006.01)

(52) U.S. Cl.
CPC ............ *G01L 1/2281* (2013.01); *G01L 1/225* (2013.01); *G01L 1/2287* (2013.01); *G01L 19/04* (2013.01)

(58) Field of Classification Search
None
See application file for complete search history.

(56) References Cited

U.S. PATENT DOCUMENTS

| | | |
|---|---|---|
| 2008/0262774 A1 | 10/2008 | Fasig et al. |
| 2009/0056466 A1 | 3/2009 | Moran et al. |
| 2014/0096621 A1 | 4/2014 | Bosscher et al. |

*Primary Examiner* — Lisa M Caputo
*Assistant Examiner* — Nigel H Plumb
(74) *Attorney, Agent, or Firm* — Coats & Bennett, PLLC

(57) ABSTRACT

Strain gages on a robotic force/torque sensor are individually temperature compensated prior to resolving the gage outputs to estimate force and torque loads on the sensor. Thermal sensors are mounted proximate each strain gage, and the initial gate and thermal sensor outputs at a known load and temperature are obtained. The force/torque sensor then undergoes warming, and strain gage and thermal sensor outputs are again obtained. These gage and thermal sensor outputs are processed to calculate coefficients to a temperature compensation equation, such as by using a least squares algorithm. Each strain gage output is compensated using the temperature compensation equation, and the temperature-compensated outputs of the strain gages are then combined to resolve temperature-compensated force and torque values.

40 Claims, 10 Drawing Sheets

ROBOTIC FORCE/TORQUE SENSOR WITH IMPROVED TEMPERATURE COMPENSATION

FIELD OF INVENTION

The present invention relates generally to a force/torque sensor for robotic applications, and in particular to thermal compensation of strain gages on the robotic force/torque sensor.

BACKGROUND

Robotics is a growing, and increasingly important, field in industrial, medical, scientific, and other applications. In many cases, in which a robot arm or a tool attached thereto contacts a workpiece, the force and/or torque applied must be closely monitored. Accordingly, a force/torque sensor is an important part of many robotic systems.

One conventional type of force/torque sensor uses strain gages to measure the deformation of small beams connecting two mechanical parts—one connected to the robot arm and the other connected to a robotic tool (or a mechanical coupling to the tool). For example, a central "hub," referred to in the art as a Tool Adapter Plate (TAP) is connected to a tool. Another body arranged annularly around, and spaced apart from, the TAP, referred to in the art as a Mounting Adapter Plate (MAP), is connected to a robotic arm. The MAP and TAP are connected to each other by a plurality of relatively thin (and hence mechanically deformable) beams, arranged radially around the TAP—in some cases resembling spokes of a wheel. Relative force or torque between objects respectively attached to the TAP and MAP attempt to move the MAP relative to the TAP, resulting in slight deformation, or bending, of at least some of the beams.

Strain gages affixed to some or all surfaces of each beam generate an electrical signal proportional to the deformation experienced by the beam. By resolving the magnitudes of strain gage outputs and noting the locations of the gages, the strain of the beams may be quantified, and forces and torques induced between the TAP and MAP may be estimated. Numerous types of strain gages, various configurations for locating strain gages on beam surfaces, different topologies interconnecting strain gages, and different means of calibrating their outputs are known in the art.

A primary source of error in robotic force/torque sensors is inaccuracy due to thermal drift. Sources of thermal drift include ambient temperature change, ambient temperature gradients, and self-heating. For silicon strain gages, changes in output voltage due to temperature change can be several times the magnitude of output voltage changes due to induced stresses—the devices may be considered to be better temperature sensors than stress sensors. Connecting strain gages in a half-bridge topology can compensate for temperature effects, but only if the gages are well matched and only if they are place precisely opposite each other. Furthermore, in addition to affecting strain gage output, temperature changes in a robotic force-torque sensor can induce mechanical stresses due to unequal expansion/compression of structural elements, which the sensor may interpret as an applied load or force. Understanding and compensating temperature error stands as a primary challenge to robotic force/torque sensor design and operation.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, strain gages on a robotic force/torque sensor are individually temperature compensated prior to resolving the gage outputs to estimate force and torque loads on the sensor. Thermal sensors are mounted proximate each strain gage, and the initial gage and thermal sensor outputs at a known load and temperature are obtained. The force/torque sensor then undergoes warming, and strain gage and thermal sensor outputs are again obtained. These gage and thermal sensor outputs are processed to calculate coefficients to a temperature compensation equation, such as by using a least squares algorithm. Each strain gage output is compensated using the temperature compensation equation, and the temperature-compensated outputs of the strain gages are then combined to resolve temperature-compensated force and torque values.

One embodiment relates to a temperature-compensated method of operating a robotic force/torque sensor. The robotic force/torque sensor includes a Tool Adapter Plate (TAP) operative to be connected to a first object and a Mounting Adapter Plate (MAP) operative to be connected to a second object. The force/torque sensor is operative to measure the direction and magnitude of force and torque between the first and second objects. Initial outputs of strain gages affixed to members connecting the MAP and TAP, and thermal sensors measuring the temperature of the MAP and TAP, are obtained at a known load and temperature. Strain gage and thermal sensor outputs are obtained after the sensor undergoes a temperature change. Coefficients to a per-gage temperature compensation equation are calculated based on the initial outputs and outputs after the temperature change. Each strain gage output is compensated using the temperature compensation equation. The temperature-compensated outputs of all strain gages are combined to resolve temperature-compensated force and torque values.

Another embodiment relates to a temperature-compensated robotic force/torque sensor. The robotic force/torque sensor includes a Tool Adapter Plate (TAP) operative to be connected to a first object; a Mounting Adapter Plate (MAP) operative to be connected to a second object; one or more deformable beams connecting the TAP to the MAP; at least one strain gage affixed to at least one side of each beam, the strain gages operative to transduce tensile and compressive forces on a surface of a side of a beam, caused by deformation of the beam, into electrical signals; a first thermal sensor affixed to the TAP; a second thermal sensor affixed to the MAP; and a measurement circuit operative to measure, in response to electrical signals from all strain gages and temperature outputs from all thermal sensors, the temperature-compensated direction and magnitude of force and torque between the first and second objects.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
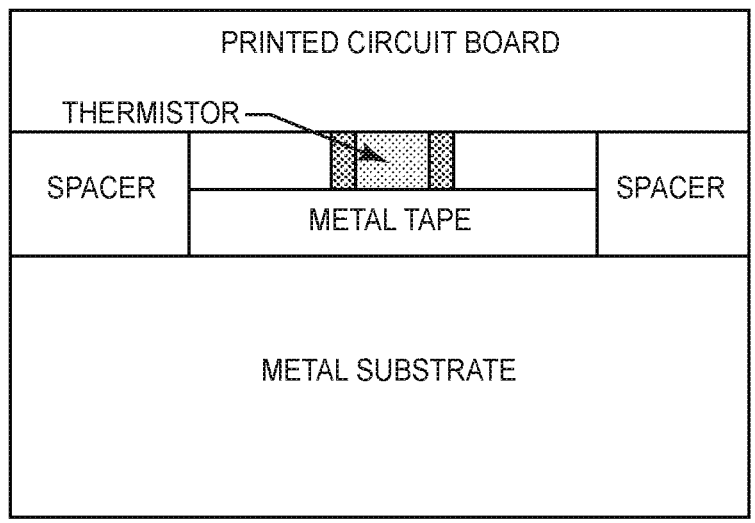
FIG. 1 is a section diagram of one means of mounting a surface-mount thermistor.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Sources of Thermal Error

It is known in the art that temperature drift is a major source of inaccuracy in robotic force/torque sensors. The inventors have identified four major sources of temperature error.

First, the use of silicon strain gages introduces thermal errors. Silicon strain gages are preferred due to their high sensitivity, compared to foil strain gages. However, they exhibit significantly worse temperature performance. There are two main temperature effects in silicon strain gages—strain gage Temperature Coefficient of Resistance (TCR) and strain gage Temperature Coefficient of Gage Factor (TCGF). TCR arises as the resistance of a silicon strain gage changes with its temperature. In some gages, resistance can change more over a 0-50° C. temperature swing than it changes due to full scale sensor loading. Much of this temperature variation can be cancelled by wiring the strain gages in a half-bridge configuration; however there is always some mismatch which affects performance. TCGF arises as the gage factor (also known as sensitivity or gain) of a silicon gage changes significantly over temperature.

Second, the particular force/torque sensor design utilized for temperature investigation and compensation is susceptible to unequal expansion and contraction of metals. The most significant error resulting from sensor design is a force output on the Z-axis caused by different expansion rates between the body of the transducer and MAP or TAP, or a temperature gradient between the MAP and TAP. Other mechanical issues may additionally contribute to thermal error, but this is by far the worst.

Third, a temperature gradient across a strain gage bridge will cause each gage in, e.g., a half-bridge circuit, to be at a different temperature. This will cause a significant bridge output due to the silicon strain gage's large temperature coefficient. This problem is largely alleviated in a quarter-bridge topology.

Finally, electronics can introduce offset error over temperature; gain error over temperature; and low frequency noise that looks like temperature error. Electronics integrated into a sensor will also cause a significant amount of self-heating that causes or exacerbates the above temperature errors.

According to embodiments of the present invention, thermal sensors are affixed to a force/torque sensor in order to allow for temperature compensation of strain gage outputs. In general, the term "thermal sensor" is to be construed broadly.

Types of Thermal Sensors

In one embodiment, a thermal sensor may comprise a strain gage, of the same type and size as the strain gages used to measure mechanical forces, affixed to an unstressed member of the force/torque sensor. As used herein, such a thermal sensor is referred to as an "unstressed strain gage," or a "thermal strain gage." In contrast, the strain gages affixed to deformable beams of the force/torque sensor—the outputs of which are used to measure forces and torques applied to the sensor—are referred to herein as "measurement strain gages," or simply "strain gages."

As mentioned in the background, the outputs of silicon strain gages, in particular, are known to vary widely over temperature, independently of the mechanical strain the gage is employed to measure. The advantages of using an unstressed strain gage as a thermal sensor include a repeatable and substantially linear thermal response. Additionally, the unstressed strain gage may utilize the same installation process as the measurement strain gages, and will mimic the self-heating characteristics of the measurement strain gages. A disadvantage to this approach is that the unstressed strain gage is, of course, sensitive to strain. Accordingly, it should be affixed to a member or element of the force/torque sensor that is not stressed by the forces and torques encountered by elements to which the measurement strain gages are affixed. This means the unstressed strain gage usually cannot be located proximate to the measurement strain gages, and hence its temperature output may not accurately reflect the measurement strain gage temperatures. Furthermore, even when affixed to an unstressed member, the unstressed strain gage may experience strain as the element to which it is affixed expands or contracts in response to changes in temperature. Accordingly, applications with wide, rapid changes in sensor temperature may mitigate against use of an unstressed strain gage as a thermal sensor.

Another possible implementation of a thermal sensor is a thermocouple—a junction of two dissimilar conductors that produces a temperature-dependent voltage between them as a result of the thermoelectric effect. Thermocouples can be very small, and are easily installed (no electrical insulation is required). They have a very wide temperature operating range, and very fast response times. On the other hand, thermocouples have relatively low resolution, accuracy, and repeatability. More circuitry is required, such as on an interface board, to read thermocouples, as compared to resistive temperature sensors. Due to their low resolution, the use of thermocouples as thermal sensors on a force/torque sensor would negatively impact resolved force/torque sensor resolution. Accordingly, they are not a good choice for this application.

Resistance Temperature Detectors (RTD) are thermal sensors, typically comprising fine wire of pure material (e.g., platinum, nickel, or copper) wrapped around a ceramic or glass core. The RTD has an accurate resistance/temperature relationship, which can be exploited to measure temperature. Their response is very linear, having excellent repeatability and accuracy. Very simple math may be used to obtain a linear reading, operating over a wide temperature range. RTDs have a relatively small signal output, and are generally larger and more expensive than other types of thermal sensors, such as thermistors. Furthermore, RTDs can be sensitive to strain, which is problematic in attempting to monitor the temperature of, or near, measurement strain gages. RTDs may be particularly suitable in applications outside of the range −20° C. to +60° C. Otherwise, the low resolution and potential strain sensitivity make them ill-suited for use as thermal sensors on force/torque sensors.

A thermistor is a type of resistor for which electrical resistance is highly dependent on temperature. Thermistors have very high temperature sensitivity, with low sensitivity to vibration or stress. These characteristics, along with good repeatability and accuracy, and wide availability in inexpensive, small packages, make thermistors a generally good choice for thermal sensors on a force/torque sensor. Thermistors do have an exponential resistance characteristic, which requires extensive mathematical processing or lookup tables to linearize their readings. In addition, they can be too sensitive for very wide temperature ranges. Overall, the high resolution of thermistors ensures the temperature compensation will not negatively impact resolved force/torque resolution, making them a good choice for temperature compensation of a force/torque sensor, at least over a moderate temperature range (e.g., −20° C. to +60° C.).

Another possible thermal sensor is an active sensor integrated circuit, such as the Texas Instruments LMT70A. This sensor provides a highly accurate and linear temperature output, with high resolution. However, it must be installed on a printed circuit board, and requires a fairly strict power supply voltage range. In applications where the requirement of a PCB is not problematic, an active sensor provides good results, and removes the need to linearize the thermal sensors.

A remote Infra-Red (IR) sensor, in some applications, can provide accurate temperature readings without requiring physical contact and hence manual wiring. One example is the Texas Instruments TMP006 IR thermopile contactless temperature sensor. However, it can be difficult to measure specific point temperatures due to the IR viewing angle. Additionally, the resolution of measurement may be inadequate for temperature compensation in a force/torque sensor application. Some measures may increase the suitability of an IR thermal sensor, such as coating at least some of the force/torque sensor body with a material that mimics a black body.

Thermal Sensor Mounting

Temperature sensors may be mounted to a force/torque sensor in a variety of ways. Wired temperature sensors may be mounted to a sensor body, using thermal transfer tape or epoxy. Surface mount temperature sensors may be mounted to a sensor body, using spacers or within a recess.

A wired temperature sensor can be mounted to the force/torque sensor body using thermal transfer tape. One suitable tape is 1/2-5-8810, available from 3M Company of Maplewood, Minn. The tape can be placed on the F/T sensor body where the temperature sensor is to be mounted, and then the wired sensor can be pressed into the tape so that it is held in place. The thermal transfer tape allows the temperature sensor to track the temperature of the F/T sensor body; it is easy to install the temperature sensor because there is no cure time; and it reduces the amount of strain the temperature sensor experiences from loading. After the sensor is installed, a protective coating such as silicone RTV (room temperature vulcanizing) can be added to protect the sensor and wires.

Similarly to the use of thermal transfer tape, a temperature sensor may be mounted to the F/T sensor body using epoxy. Epoxy may provide a more robust connection for high vibration environments, but at the cost of increased installation time and increased strain applied to the temperature sensor during loading. If the temperature sensor has uninsulated wires, it may be necessary to apply an insulating layer of epoxy before the temperature sensor can be installed.

One way to reduce the cost of temperature sensor installation is to use surface mount temperature sensors on a PCB (printed circuit board) to measure the temperature of the F/T sensor body. This may be accomplished by mounting the surface mount temperature sensor on the bottom of a PCB which is mounted to the F/T sensor body, such that the temperature sensor faces the F/T sensor body. A spacer such as PCB material could be utilized to create a gap between the temperature sensor PCB and the F/T sensor body, within which the temperature sensor would reside. Thermal tape or paste may be installed in this cavity to allow the temperature sensor to measure the F/T sensor body temperature, and to allow for some tolerance stackup so the temperature sensor does not need to physically touch the F/T sensor body. FIG. 1 depicts an example of this mounting approach.

As an alternative to creating a cavity using PCB material, a recess may be milled into the F/T sensor body where the temperature sensor is installed.

Categories of Temperature Error

The temperature errors monitored can be classified into three categories. First is strain gage bias change over temperature. This accounts for strain gage TCR and electronics offset drift. This can also account for unequal expansion rates of adaptor plates when no temperature gradient is present. Second is gain change over temperature. This accounts for strain gage TCGF, electronics excitation voltage temperature coefficient, and electronics gain temperature coefficient. The final category is the MAP to TAP temperature gradient. This accounts for mechanical behavior from a temperature gradient from the sensor's MAP to the sensor's TAP.

The inventors have developed an analog front-end design that minimizes electronics-related temperature error. This allowed them to focus on the temperature compensation of the force/torque sensor itself, since the analog electronics are much more stable than the temperature sensors. The inventors discovered that the bias change over temperature and gain change over temperature can both be modeled as a linear curve. The accuracy of the linear model varies by the force/torque sensor monitored. However, among all F/T sensors, a more accurate mathematical model is a quadratic curve. The inventors also discovered that the MAP to TAP temperature gradient has a roughly linear relationship to a F/T sensor's Z-axis force output with a stable temperature gradient and a relatively small temperature difference between MAP and TAP.

Temperature Compensation—Unstrained Strain Gages

Two methods of temperature compensation using unstrained thermal sensors are bias compensation, and gain compensation.

Figure 2:
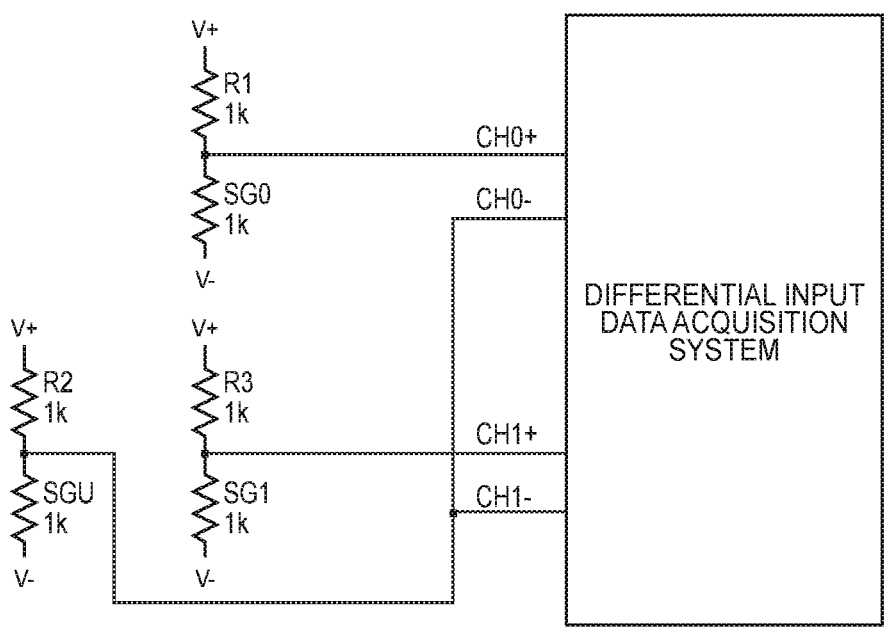
FIG. 2 is a schematic circuit diagram of quarter bridge sensor topology measurement.

Bias Compensation—In a quarter bridge temperature sensor topology the unstrained gage will exhibit largely the same temperature behavior as the load sensing gages. The load sensing gages in a quarter-bridge can be effectively temperature compensated by subtracting the unstrained gage voltage from the load sensing gage voltage. This subtraction can be performed in software or directly by a differential input DAQ or ADC. This effectively creates a pseudo half-bridge circuit that allows a quarter bridge instrumented F/T sensor to have acceptable temperature performance. FIG. 2 depicts a representative circuit, in which R1-R3 are fixed bridge completion resistors, SG0 and SG1 are load-sensing strain gages, and SGU is an unstrained strain gage (used for temperature sensing/compensation).

Gain Compensation—Silicon strain gages change sensitivity over temperature, so gain compensation allows the sensor to maintain sensitivity over wide temperature ranges. This change in sensitivity over temperature is fairly consistent from gage to gage and can be reasonably characterized using a few representative sensors. The basic compensation math is as follows $$FT_{compensated} = k \cdot FT_{uncompensated} \text{ where}$$

$$k = F(G_{unstrained} - G_{unstrained\_at\_room\_temp}) \quad (1)$$

The function in this equation is a simple quadratic fit. The unstrained gage output is referenced to its output at room temperature to account for variance in the bonded resistance of the instrumented strain gage. Using this method, changes in gain can be compensated because gain should be constant at isothermal points throughout the operating range.

Temperature Compensation—Monitoring Measurement Strain Gage Temperatures

Temperature effects can be compensated on each gage using a matrix that combines bias and gain quadratic models along with MAP to TAP gradients. Compensating gages rather than resolved F/T sensor output simplifies the compensation model by reducing the number of temperature sensors input to the algorithm. A simple compensation model requires less temperature characterization, making it cheaper and more consistent than a complex model.

The equation for a temperature-compensated gage reading is:

$$G_{n-compensated} = C_0 * G_n + C_1 * T_n + C_2 * T_n^2 + C_3 * G_n * T_n + C_4 * G_n * T_n^2 + C_5 * (T_{map} - T_{tap}) + C_6 * 1 \quad (2)$$

where $G_n$ is the gage reading for gage n, $T_n$ is the temperature of the gage, $T_{map}$ is the temperature of the MAP, and $T_{tap}$ is the temperature of the TAP. Table 1 below maps the compensation equation coefficients to the terms on which they act:

TABLE 1

Temperature Compensation Equation Coefficients

| | Coefficient | | | | | | |
|---|---|---|---|---|---|---|---|
| | $C_0$ | $C_1$ | $C_2$ | $C_3$ | $C_4$ | $C_5$ | $C_6$ |
| Terms | $G_n$ | $T_n$ | $T_n^2$ | $G_n * T_n$ | $G_n * T_n^2$ | $T_{map} - T_{tap}$ | 1 |
| Comment | gain | bias | | sensitivity | | MAP/TAP | constant c for quadratic equation |

The resulting compensated gage readings are then multiplied by a standard 6×6 calibration matrix resulting in 6-axis F/T sensor readings. While it is possible to enter all temperature data into the force/torque matrices, this approach is computationally complex. The more optimized approach is to temperature-compensate each individual gage, then resolve the temperature-compensated gage readings to achieve force/torque values.

The compensation matrix is calculated, in one embodiment, using a least squares algorithm. The least squares algorithm can be given the entire data set from the characterization tests, or it can be given specific readings from only the soak points; either method produces comparable results. One requirement to obtain good results is estimating a correct set of expected gage readings for the least squares algorithm. Each test requires one data point with the sensor thermally equalized at 22° C., to know what the gages are supposed to read for that test at different temperatures. A constant load should also be applied to the sensor throughout the test. This allows for arbitrary loads to the sensor for each characterization test. It is possible to calculate expected gage readings at 22° C. by extrapolating gage values using the loaded and unloaded temperature swings. This can be useful, with some force/torque sensors, if a test cannot soak at 22° C. See Appendix A for an example, including full thermal sensor data and calculation of the temperature compensation coefficients.

Deriving Temperature of Strain Gages from Bridge Current

A primary reason for using a half-bridge or full-bridge circuit topology to measure strain gage output is to cancel the effect of the large temperature coefficient of silicon strain gages. By arranging the gages in a half-bridge or full-bridge circuit, with gages receiving equal and opposite strain from sensor loading, the bridge output voltage change from loading is maximized while the bridge output voltage change from temperature change is minimized.

One consequence of using a half-bridge or full-bridge circuit topology with silicon strain gages is that, with a constant voltage excitation, the current through the bridge varies with temperature, while staying mostly constant with loading. This allows the current through the strain gage bridge to indicate a temperature reading. Thus, the same silicon strain gages can measure both loading and temperature—the temperature thus derived can be used for temperature compensation of the F/T sensor, as described herein.

One problem with this approach is that it can be difficult to arrange strain gages so that they actually experience equal and opposite strains. This strain mismatch causes the bridge current to vary with sensor loading, resulting in an inaccurate temperature calculation.

It has been discovered that it is possible to use the bridge output voltage and bridge current to calculate the average bridge temperature, as long as: (1) there are more than one strain sensing elements in the bridge (otherwise the bridge voltage and current would be proportional and wouldn't provide enough information), and (2) all gages have the same sign temperature coefficient (large temperature coefficient variations make this less accurate).

Figure 3:
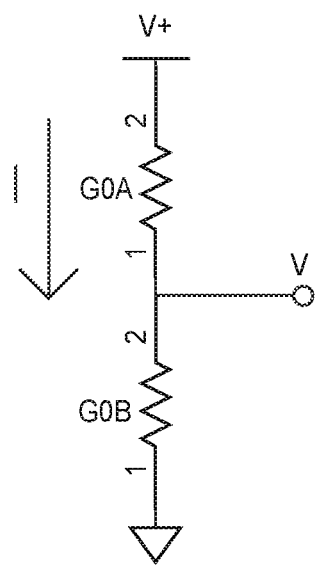
FIG. 3 is a schematic circuit diagram of voltage and current in a bridge circuit.

FIG. 3 depicts the circuit configuration for one embodiment. Linear and quadratic combinations of the bridge output voltage and bridge current are multiplied by a matrix of coefficients to derive average temperature values for the strain gage bridge. These coefficients are derived using a least squares fit to sensor loading data and sensor temperature data. This math can be simplified by removing terms to reduce the complexity of the characterization process, or additional nonlinear terms could be added to improve the model's fit. The coefficients are:

TABLE 2

Average Temperature Coefficients

| Coefficient | | | | | | | |
|---|---|---|---|---|---|---|---|
| $C_0$ | $C_1$ | $C_2$ | $C_3$ | $C_4$ | $C_5$ | $C_6$ | $C_7$ |
| Terms V | $V^2$ | $V^3$ | I | $I^2$ | $V*I$ | $V*I^2$ | 1 |

The equation yielding the average bridge temperature is:

$$Temp_{avg} = C0*V + C1*V^2 + C2*V^3 + C3*I + C4*I^2 + C5*V*I + C6*V*I^2 + C7 \quad (3)$$

Of course, in any given implementation, one or more of the coefficients may be zero, effectively eliminating the corresponding term from equation (3).

Figure 4:
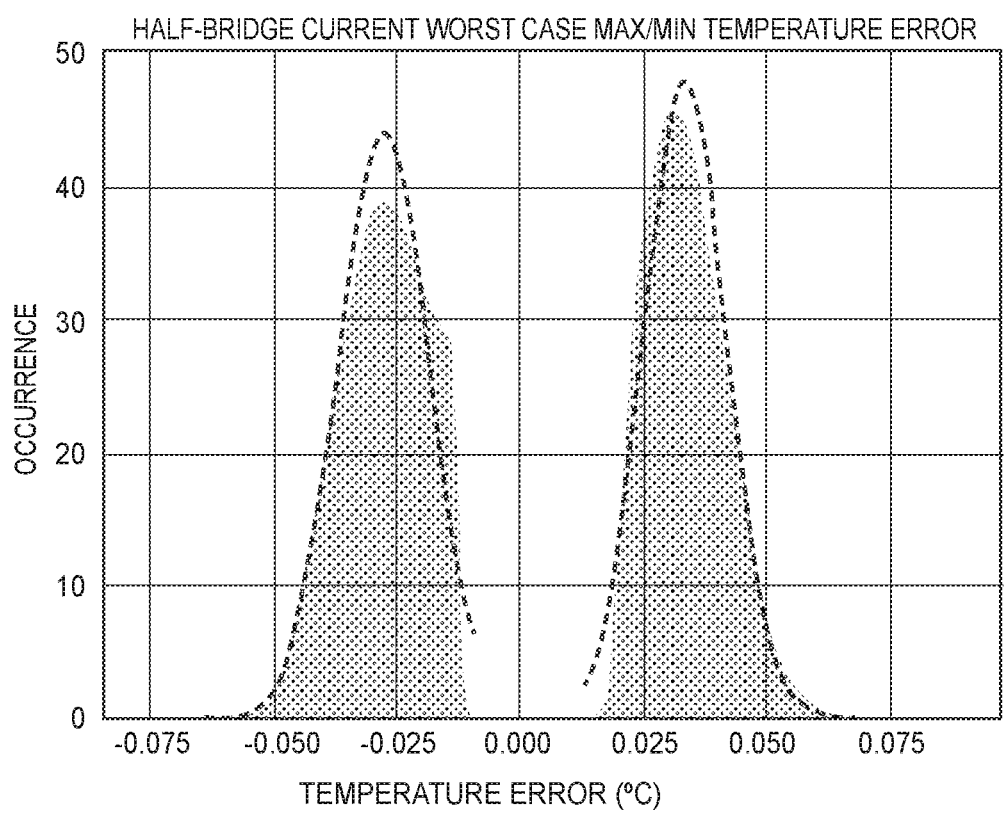
FIG. 4 is a graph of worst case min/max temperature errors for a half-bridge circuit topology calculated from the bridge current measurement.

A Monte-Carlo style simulation of a silicon strain gage bridge shows that with adequate calibration steps the model above can calculate accurate temperature data. The simulation creates a set of different gage combinations where the initial resistance, bond strain, TCR, TCGF, and GF all vary with a normal distribution. For each gage combination several different strain and temperature combinations are applied and each combination has a least-squares fit to the input temperature. The graph of FIG. 4, and the statistics below, show the max/min worst case temperature error for each gage combination, demonstrating this model is a good fit to silicon strain gage behavior.

Num samples: 2000000
Worst max temp error: 0.089296
Avg max temp error: 0.033637
Std max temp error: 0.008338
Worst min temp error: −0.075849
Avg min temp error: −0.027590
Std min temp error: 0.009062

This calculation still works if one gage in a half-bridge experiences reduced strain or no strain from loading, because the voltage and current readings still differ significantly between loading and temperature changes. The compensation coefficients can be derived without knowing the actual strains experienced by the gages; only the temperature experienced by the gages is important. Using the strain gages as their own temperature sensors eliminates any time lag between the strain gages and the temperature measured by the F/T sensor. Using the strain gages as their own temperature sensor can be an inexpensive method to add temperature sensing or temperature compensation to a F/T sensor without adding material cost.

Temperature Compensation Experiments

Several experiments were conducted, with a variety of temperature sensors and various heating and loading conditions.

Figure 5:
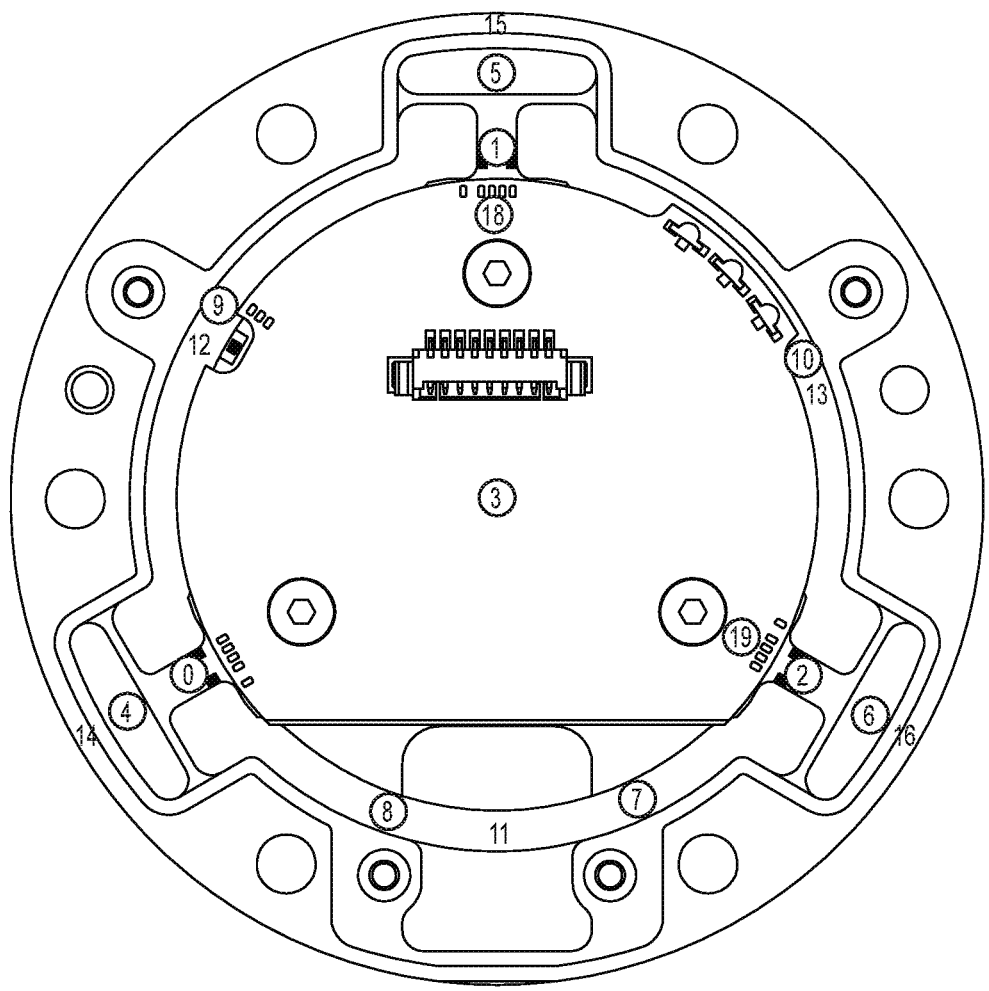
FIG. 5 depicts thermal sensor placement on a robotic force/torque sensor.

In one experiment, 17 thermistors were placed in various locations on a particular force/torque sensor, as indicated in FIG. 5. The F/T sensor investigated was an Axia 80 monolithic F/T sensor available from ATI Industrial Automation, Inc. of Apex, N.C. The Axia 80 F/T sensor has strain gages on only the upper surface of each beam connecting the MAP and TAP, as described in US Patent Application Publication No. 2017/0205296 (the '296 application), assigned to the assignee of the present application and incorporated herein by reference in its entirety. As indicated in FIG. 1, thermistors 0, 1, and 2 were placed directly adjacent strain gages. Fourteen other thermistors were placed in various locations on both the MAP and TAP portions of the sensor. The thermistors with numbers in circles were placed on the top or side wall; thermistor numbers without circles were placed on the TAP crevice.

In another experiment, two thermistors were placed on a Nano 25 F/T sensor, available from ATI Industrial Automation, Inc. of Apex, N.C. A suitable thermistor is the NXFT15XH103FA2B025 available from Murata Manufacturing Co., Ltd. of Nagaokakyo, Kyoto, Japan. One thermistor was affixed to the MAP, and the other to the TAP, thus providing a MAP/TAP temperature gradient. The temperatures of individual measurement strain gages were not measured or compensated.

All tests were performed with the same aluminum plates attached to the F/T sensor because the F/T sensor is a steel body and the aluminum plates will impart a load on the F/T sensor as they change temperature. Keeping the plates consistent allows this behavior to be compensated. Three tests were performed: unloaded temperature swing, loaded temperature swing, and MAP/TAP thermal gradient.

F/T sensor unloaded temperature swing—The sensor was placed on the floor of a temperature chamber and run through a 0-50° C. temperature swing with 3 hour soak points at 0° C., 22° C., and 50° C.

F/T sensor loaded temperature swing—A complex load was applied to the sensor that caused a significant change in all gage outputs. The sensor was then run through a 0-50° C. temperature swing with 3 hour soak points at 0° C., 22° C., and 50° C.

MAP heating applied with TAP heat sink—A large metal plate was attached to the TAP of the sensor using thermal transfer tape and heat was applied to the MAP of the sensor using a hot plate. A thermocouple was used to ensure the hot plate reached 50° C. near the sensor and the TAP heat sink ensured the TAP stayed cooler than the MAP. The test was started at 22° C. to ensure a room temperature reading with the TAP heat sink was taken.

The temperature compensation equation above was applied to each strain gage.

The ordinary least squares algorithm is used to calculate the above compensation coefficients using the below test data. The ordinary least squares algorithm requires two data sets in order to calculate a compensation matrix: (1) training data for each test, and (2) input or desired data for each test.

A set of gage and thermistor training data was collected from the soak points of each test and at least one sample with a significant MAP to TAP temperature gradient. The data below is in 24-bit counts.

| Description | G0 | G1 | G2 | G3 | G4 | G5 | TAP | MAP |
|---|---|---|---|---|---|---|---|---|
| 0° C. no load | −109275 | −202564 | −27135 | −68595 | −51450 | 884 | −2105077 | −1958071 |
| 22° C. no load | −119295 | −210996 | −37952 | −63898 | −60794 | −2543 | −375038 | −175817 |
| 50° C. no load | −133424 | −220075 | −50570 | −58955 | −73105 | −7001 | 1542173 | 1755958 |
| 0° C. load | −339596 | 117263 | 84603.1 | 337492 | 70706.6 | 235424 | −2097453 | −1955110 |
| 22° C. load | −349417 | 108634 | 72969.1 | 342428 | 60678.2 | 231572 | −376046 | −179785 |
| 50° C. load | −358781 | 97568.7 | 58507.1 | 344845 | 46288.2 | 225230 | 1542387 | 1756143 |
| 22° C. MAP heating | −114823 | −203858 | −54863 | −89834 | −57615 | −7647 | −429929 | −265120 |
| MAP heating 1 | −162071 | −210788 | −108417 | −88308 | −112375 | −15738 | 120871.5 | 1907875 |
| MAP heating 2 | −136118 | −207776 | −78510 | −87715 | −81040 | −11204 | 291801.4 | 1106552 |

The thermistor readings were linearized using the below equations and B constant for the thermistor used. Note: The DAQ system introduced a significant offset error to the thermistor calculations, but this does not significantly affect the compensation results.

$$vpv = \frac{\text{Counts}}{2^{23}} + 0.5$$

$$R = R_0 * \frac{1 - vpv}{vpv}$$

$$T(° C.) = \frac{B}{\ln\left(\frac{R}{R_0 * e^{-B/T_0}}\right)} - 273.15$$

where B=3380, $R_0$=10kΩ, $T_0$=298.15 K for the specific thermistors used.

| Description | TAP ° C. | MAP ° C. |
|---|---|---|
| 0° C. no load | −1.45 | 0.56 |
| 22° C. no load | 20.36 | 22.81 |
| 50° C. no load | 46.77 | 50.47 |
| 0° C. load | −1.34 | 0.60 |
| 22° C. load | 20.35 | 22.76 |
| 50° C. load | 46.78 | 50.47 |
| 22° C. MAP heating | 19.69 | 21.71 |
| MAP heating 1 | 26.52 | 53.26 |
| MAP heating 2 | 28.71 | 39.92 |

For each gage, the set of training data for that gage was calculated. For the temperature input, a weighted average between the MAP and TAP temperature sensors was calculated (for larger sensors, use the temperature sensor next to the gage). In this case, equal weighting between the MAP and TAP was used.

$$T = 0.5 * T_{MAP} + 0.5 * T_{TAP}$$

| G0 | T ° C. | T^2 | G0*T | G0*T^2 | MAP-TAP ° C. | 1 |
|---|---|---|---|---|---|---|
| −109275 | −0.44 | 0.20 | 48416 | −21451 | 2.02 | 1 |
| −119295 | 21.58 | 465.86 | −2574841 | −55574867 | 2.45 | 1 |
| −133424 | 48.62 | 2363.81 | −6486949 | −315388878 | 3.70 | 1 |
| −339596 | −0.37 | 0.14 | 125664 | −46500 | 1.95 | 1 |
| −349417 | 21.55 | 464.54 | −7531009 | −162316459 | 2.42 | 1 |
| −358781 | 48.62 | 2364.14 | −17444811 | −848209002 | 3.69 | 1 |
| −114823 | 20.70 | 428.35 | −2376448 | −49184550 | 2.02 | 1 |
| −162071 | 39.89 | 1591.56 | −6465736 | −257946792 | 26.74 | 1 |
| −136118 | 34.32 | 1177.71 | −4671273 | −160307578 | 11.21 | 1 |

| G1 | T ° C. | T^2 | G1*T | G1*T^2 | MAP-TAP ° C. | 1 |
|---|---|---|---|---|---|---|
| −202564 | −0.44 | 0.20 | 89748 | −39764 | 2.02 | 1 |
| −210996 | 21.58 | 465.86 | −455104 | −98294922 | 2.45 | 1 |
| −220075 | 48.62 | 2363.81 | −10699839 | −520215330 | 3.70 | 1 |
| 117263 | −0.37 | 0.14 | −43392 | 16057 | 1.95 | 1 |
| 108634 | 21.55 | 464.54 | 2341392 | 50464218 | 2.42 | 1 |
| 97569 | 48.62 | 2364.14 | 4744028 | 230666115 | 3.69 | 1 |
| −203858 | 20.70 | 428.35 | −4219180 | −87322968 | 2.02 | 1 |
| −210788 | 39.89 | 1591.56 | −8409263 | −335482661 | 26.74 | 1 |
| −207776 | 34.32 | 1177.71 | −7130407 | −244699512 | 11.21 | 1 |

| G2 | T ° C. | T^2 | G2*T | G2*T^2 | MAP-TAP ° C. | 1 |
|---|---|---|---|---|---|---|
| −27135 | −0.44 | 0.20 | 12022 | −5327 | 2.02 | 1 |
| −37952 | 21.58 | 465.86 | −819153 | −17680438 | 2.45 | 1 |
| −50570 | 48.62 | 2363.81 | −2458674 | −119538246 | 3.70 | 1 |
| 84603 | −0.37 | 0.14 | −31306 | 11585 | 1.95 | 1 |
| 72969 | 21.55 | 464.54 | 1572710 | 33896746 | 2.42 | 1 |
| 58507 | 48.62 | 2364.14 | 2844759 | 138319082 | 3.69 | 1 |
| −54863 | 20.70 | 428.35 | −1135472 | −23500493 | 2.02 | 1 |
| −108417 | 39.89 | 1591.56 | −4325251 | −172553358 | 26.74 | 1 |
| −78510 | 34.32 | 1177.71 | −2694270 | −92461282 | 11.21 | 1 |

| G3 | T ° C. | T^2 | G3*T | G3*T^2 | MAP-TAP ° C. | 1 |
|---|---|---|---|---|---|---|
| −68595 | −0.44 | 0.20 | 30392 | −13465 | 2.02 | 1 |
| −63898 | 21.58 | 465.86 | −1379167 | −29767681 | 2.45 | 1 |
| −58955 | 48.62 | 2363.81 | −2866325 | −139357835 | 3.70 | 1 |
| 337492 | −0.37 | 0.14 | −124885 | 46212 | 1.95 | 1 |
| 342428 | 21.55 | 464.54 | 7380381 | 159069957 | 2.42 | 1 |
| 344845 | 48.62 | 2364.14 | 16767194 | 815261604 | 3.69 | 1 |
| −89834 | 20.70 | 428.35 | −1859269 | −38480667 | 2.02 | 1 |
| −88308 | 39.89 | 1591.56 | −3523010 | −140548428 | 26.74 | 1 |
| −87715 | 34.32 | 1177.71 | −3010180 | −103302588 | 11.21 | 1 |

| G4 | T ° C. | T^2 | G4*T | G4*T^2 | MAP-TAP ° C. | 1 |
|---|---|---|---|---|---|---|
| −51450 | −0.44 | 0.20 | 22795 | −10100 | 2.02 | 1 |
| −60794 | 21.58 | 465.86 | −1312168 | −28321575 | 2.45 | 1 |
| −73105 | 48.62 | 2363.81 | −3554280 | −172805484 | 3.70 | 1 |
| 70707 | −0.37 | 0.14 | −26164 | 9682 | 1.95 | 1 |
| 60678 | 21.55 | 464.54 | 1307802 | 28187175 | 2.42 | 1 |
| 46288 | 48.62 | 2364.14 | 2250643 | 109431735 | 3.69 | 1 |
| −57615 | 20.70 | 428.35 | −1192431 | −24679347 | 2.02 | 1 |
| −112375 | 39.89 | 1591.56 | −4483142 | −178852327 | 26.74 | 1 |
| −81040 | 34.32 | 1177.71 | −2781125 | −95441960 | 11.21 | 1 |

| G5 | T ° C. | T^2 | G5*T | G5*T^2 | MAP-TAP ° C. | 1 |
|---|---|---|---|---|---|---|
| 884 | −0.44 | 0.20 | −392 | 174 | 2.02 | 1 |
| −2543 | 21.58 | 465.86 | −54886 | −1184651 | 2.45 | 1 |
| −7001 | 48.62 | 2363.81 | −340385 | −16549178 | 3.70 | 1 |
| 235424 | −0.37 | 0.14 | −87116 | 32236 | 1.95 | 1 |
| 231572 | 21.55 | 464.54 | 4991059 | 107573378 | 2.42 | 1 |
| 225230 | 48.62 | 2364.14 | 10951237 | 532475670 | 3.69 | 1 |
| −7647 | 20.70 | 428.35 | −158259 | −3275437 | 2.02 | 1 |
| −15738 | 39.89 | 1591.56 | −627857 | −25048008 | 26.74 | 1 |
| −11204 | 34.32 | 1177.71 | −384487 | −13194738 | 11.21 | 1 |

The input data set consists of the gage values the sensor should output for each of the above samples in the training data set. In this case, the gages should output the readings at 22° C., with no MAP to TAP thermal gradient present.

| Description | G0 | G1 | G2 | G3 | G4 | G5 |
|---|---|---|---|---|---|---|
| 0° C. no load | −119295 | −210996 | −37952 | −63898 | −60794 | −2543 |
| 22° C. no load | −119295 | −210996 | −37952 | −63898 | −60794 | −2543 |
| 50° C. no load | −119295 | −210996 | −37952 | −63898 | −60794 | −2543 |
| 0° C. load | −349417 | 108634 | 72969.1 | 342428 | 60678.2 | 231572 |
| 22° C. load | −349417 | 108634 | 72969.1 | 342428 | 60678.2 | 231572 |
| 50° C. load | −349417 | 108634 | 72969.1 | −342428 | 60678.2 | 231572 |
| 22° C. MAP heating | −114823 | −203858 | −54863 | −89834 | −57615 | −7647 |
| MAP heating 1 | −114823 | −203858 | −54863 | −89834 | −57615 | −7647 |
| MAP heating 2 | −114823 | −203858 | −54863 | −89834 | −57615 | −7647 |

The compensation matrices were calculated using the least squares algorithm and the input and training data sets. The least squares algorithm will find coefficients for the compensation model that minimize error between the compensated outputs and the input data set. Since the input data set is an ideal set of sensor data with no temperature-dependent output, the compensated outputs will have greatly reduced temperature behavior.

Let A denote a matrix containing the training data set for one gage and B denote a matrix containing the input data set for one gage.

$$TempCompMatrix = ((A^T * A)^{-1} * A^T * B)^T$$

| | G | T° C. | T^2 | G*T | G*T^2 | MAP-TAP ° C. | 1 |
|---|---|---|---|---|---|---|---|
| G0 | 0.998471 | 474.80 | 0.61 | 0.000004 | 9.79512E−06 | 1617.86 | −13325 |
| G1 | 0.999026 | 388.51 | −0.05 | −0.000027 | 3.72456E−06 | 18.98 | −8410 |
| G2 | 0.994787 | 533.87 | −2.01 | −0.000669 | 2.27456E−05 | 1905.14 | −14694 |
| G3 | 1.000541 | −246.09 | 1.09 | −0.000111 | 4.734E−06 | 87.43 | 4477 |
| G4 | 0.995720 | 427.43 | −0.44 | −0.000519 | 1.97281E−05 | 1973.10 | −13418 |
| G5 | 0.998033 | 149.03 | 0.08 | −0.000009 | 4.50661E−06 | 214.94 | −3755 |

Compensated gage data was calculated from the raw gage readings and the compensation matrices by multiplying each gage matrix by the transpose of each compensation matrix.

$$G_{comp} = Gage_{matrix} * Comp_{matrix}^T$$

Ex:
$G0_{comp}$=[−291436 −3.14 9.89 916527 −2882350 0.042 1]* [1.016102 −1653.07 31.89 −0.002649 6.75E−05 1936.48 15565]$^T$
$G0_{comp}$=−276867

Resolved F/T data was then calculated from the compensated gage data using a 6×6 linear matrix.
[Fx Fy Fz Tx Ty Tz]=[G0 G1 G2 G3 G4 G5]*(6×6 FT Matrix)$^T$
F/T Sensor Calibration Matrix:

| | G0 | G1 | G2 | G3 | G4 | G5 |
|---|---|---|---|---|---|---|
| Fx | −3.622E−07 | 1.094E−06 | 6.459E−06 | −1.574E−04 | −6.279E−06 | 1.568E−04 |
| Fy | −7.498E−06 | 1.778E−04 | −3.255E−06 | −9.034E−05 | 1.216E−06 | −9.203E−05 |
| Fz | 3.156E−04 | −6.618E−06 | 3.212E−04 | −3.815E−07 | 3.237E−04 | 4.693E−08 |
| Tx | −1.852E−08 | 1.520E−06 | −3.195E−06 | −7.959E−07 | 3.175E−06 | −7.782E−07 |
| Ty | 3.554E−06 | −8.811E−08 | −1.871E−06 | 1.351E−06 | −1.781E−06 | −1.354E−06 |
| Tz | 7.215E−08 | −1.394E−06 | 8.726E−08 | −1.419E−06 | 1.429E−08 | −1.444E−06 |

To verify the compensated F/T sensor's performance, a further temperature test was performed. The F/T sensor was mounted in a temperature chamber and soaked at 0° C., 12.5° C., 22° C., 37.5° C., and 50° C. With this temperature compensation method, the sensor's temperature error is brought within 1% of full scale error for the calibration.

Calibration load ratings: Fxy=125N, Fz=500N, Txyz=3 Nm.

Figure 6:
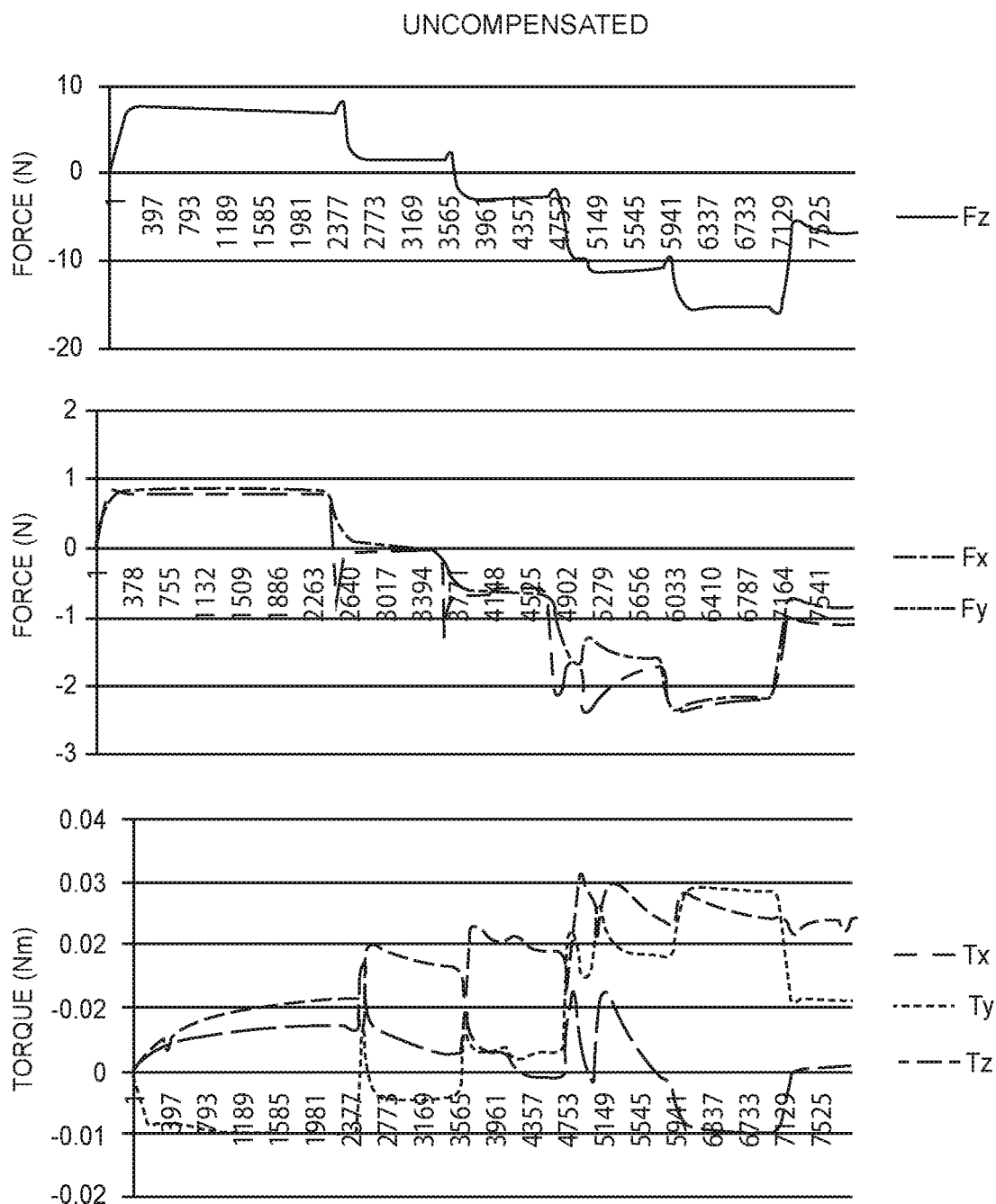
FIG. 6 is a graph of uncompensated force and torque readings.
Figure 7:
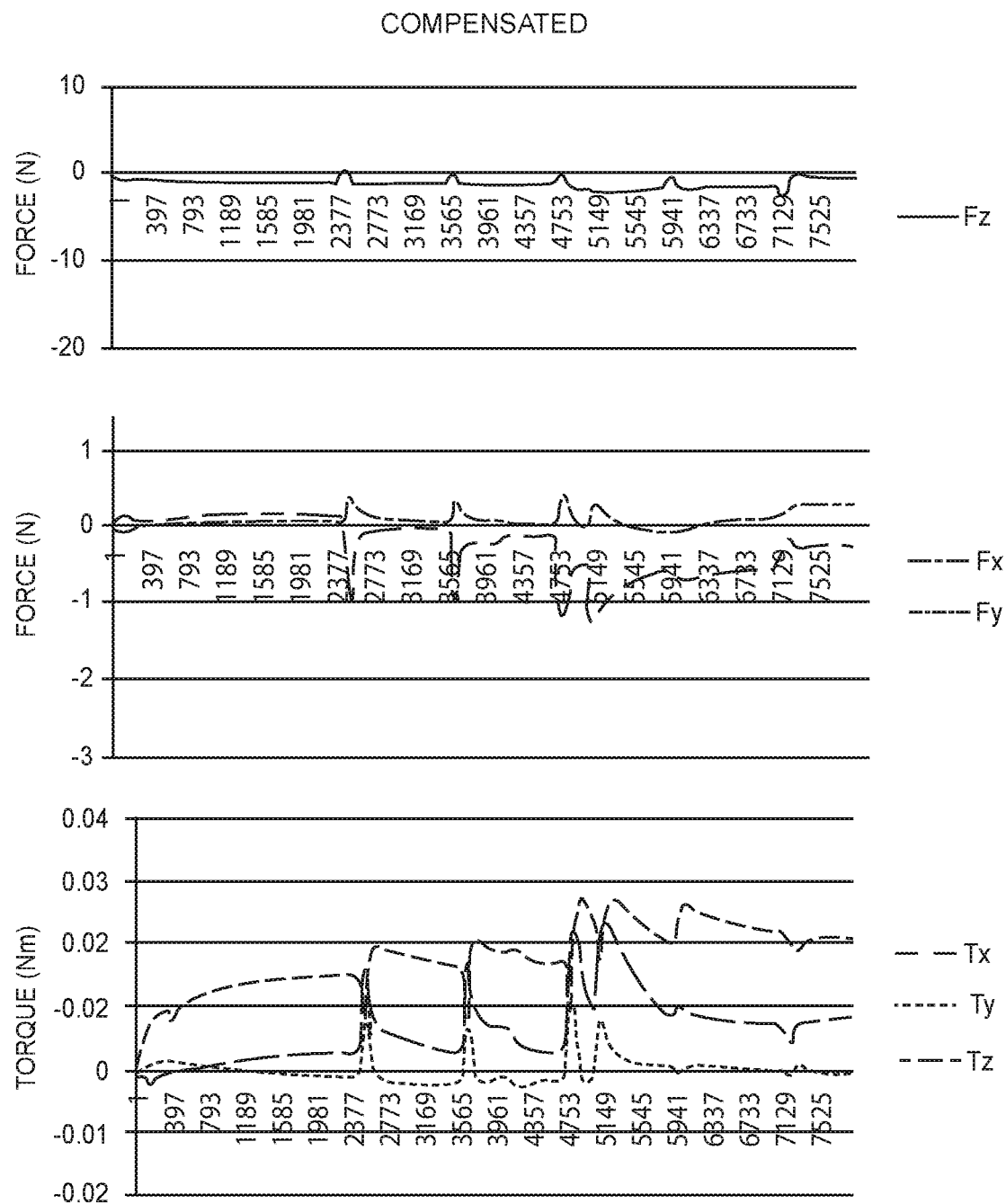
FIG. 7 is a graph of the force and torque readings of FIG. 5 after temperature compensation.

FIG. 6 depicts the uncompensated results, and FIG. 7 depicts temperature compensated result, for the three forces and torques (Fx, Fy, Fz, Tx, Ty, Tx). The experiment shows a substantial improvement in Fz drift performance and good improvement in Fx, Fy, and Ty as well. Tz in particular did not show much improvement; however, Tz was already below 1% FS error before temperature compensation.

Experimental Results

Figure 8A:
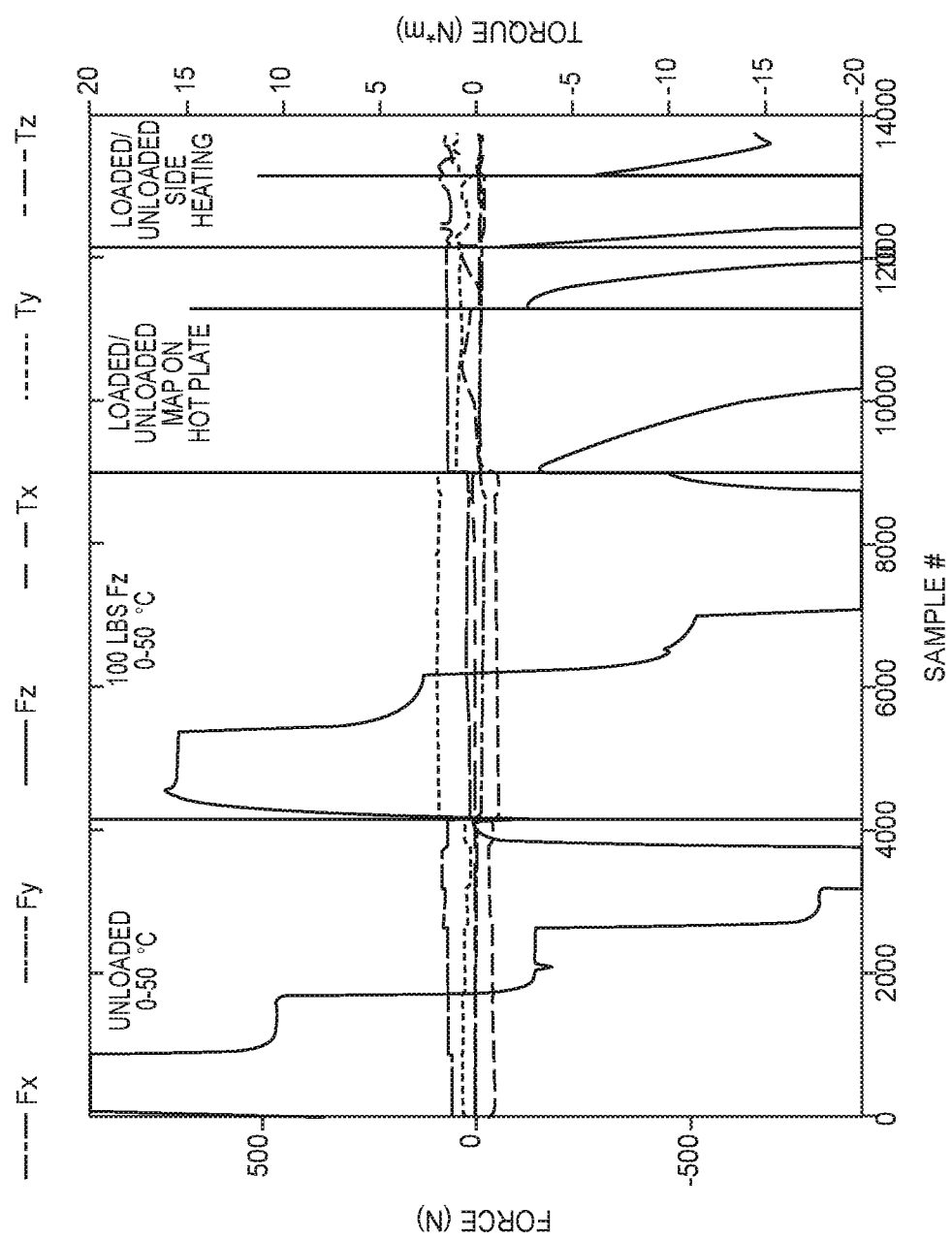
FIGS. 8A-8C are graphs of force/torque resolution for a robotic force/torque sensor under various conditions of heating and loading, using no temperature compensation (8A), unstressed strain gage output compensation (8B), and per-strain gage temperature compensation (8C).
Figure 8B:
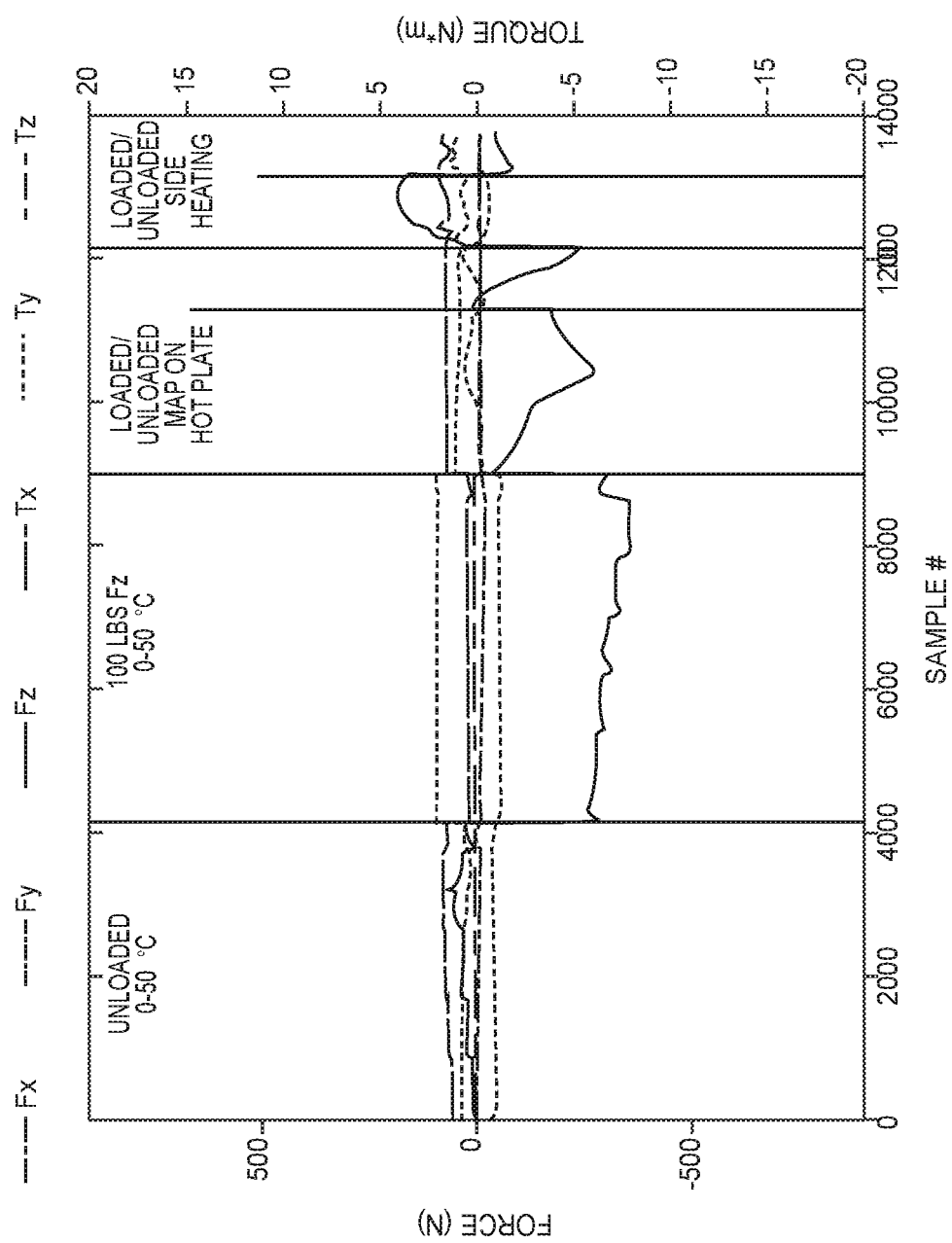
Figure 8C:
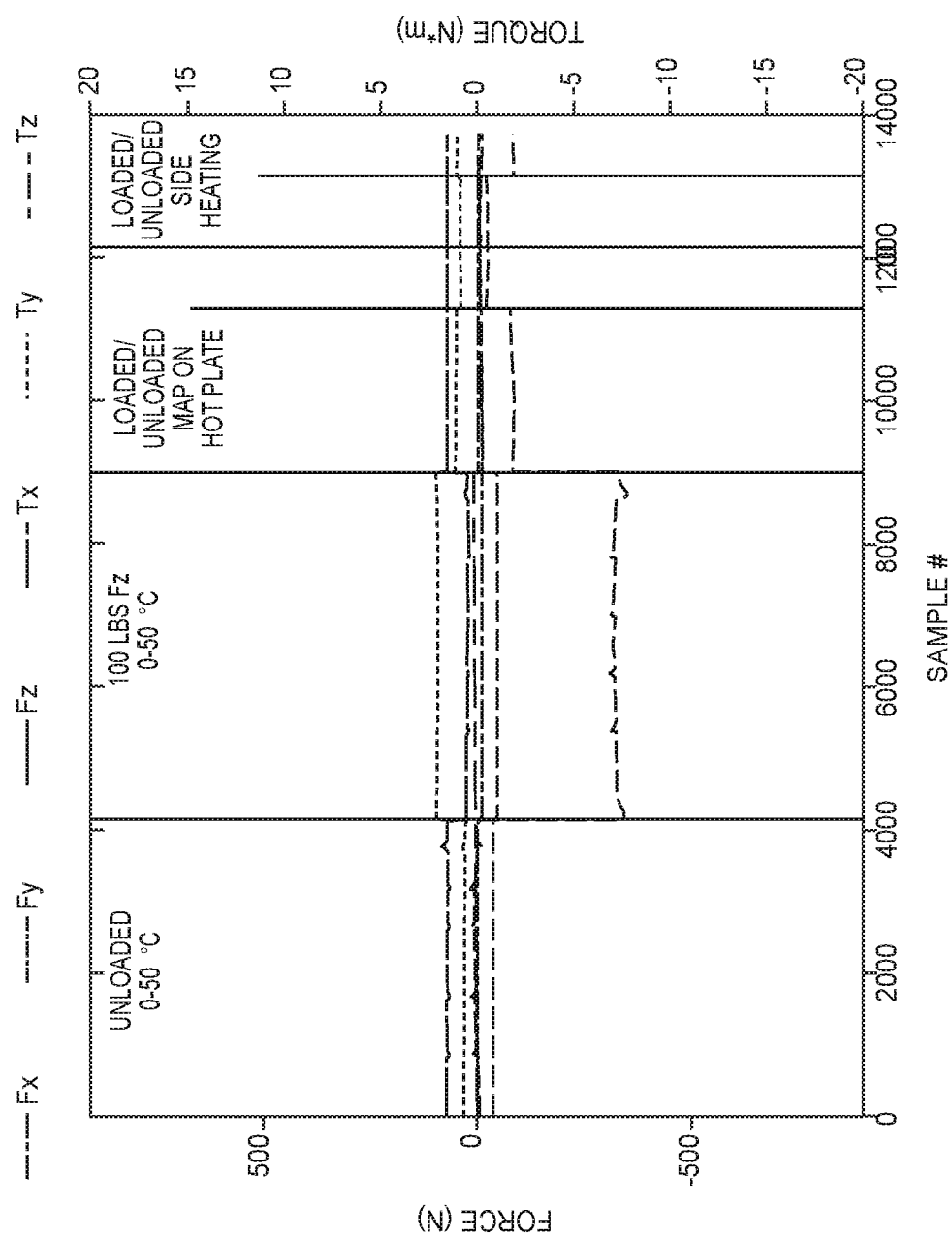

FIGS. 8A-8C depict different treatments of the measurement strain gage outputs of an Axia 80 force/torque sensor, for each of a series of tests. The tests included unloaded temperature swing; loaded temperature swing; and both loaded and unloaded MAP to TAP temperature gradient, with heat applied to both the MAP and the TAP.

FIG. 8A depicts these tests with no temperature compensation of the measurement strain gage outputs. For the unloaded temperature swing—depicted on the left of FIG. 8A, prior to the first vertical black line—gage data and temperature sensor data were logged with the sensor unloaded, through a temperature swing of 0-50° C. The test includes four long "soak" points—where an applied heating is maintained over time—to ensure the entire sensor reaches thermal equilibrium. This test is used to calibrate the temperature sensors and to compensate bias change over temperature.

The second graph depicts a loaded temperature swing, in which the sensor was loaded with a weight on the Fz surface of approximately 50% of the load expected to generate a full scale deflection. The temperature swing is the same as for the unloaded case (four soak points over 0-50° C.). In general, the temperatures may be different, but it is important to use sufficient soak times between temperature changes to ensure the weights come to the same temperature as the sensor body, and are not thermal sinks.

The last two sections of FIG. 8A each depict both loaded and unloaded conditions as heat is applied to only a portion of the sensor. In the third section, the MAP was heated as a weight was applied to the TAP. The fourth section depicts loaded and unloaded conditions as heat was applied to one side of the sensor, i.e., to the TAP.

In all four tests, using quarter bridge topology on the gages, and with no temperature compensation, the Fz reading was useless. The sensor output varied over its full range of 900 N (inflection points following flats in the graph represent changes in applied heat).

Figure 9:
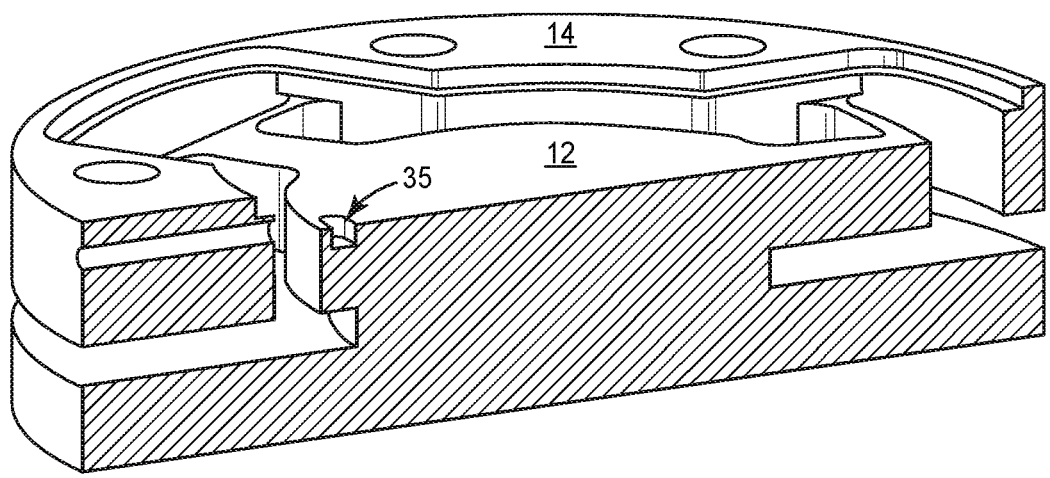
FIG. 9 is a section perspective view of a robotic force/torque sensor showing an unstrained member or the mounting of a temperature compensation strain gage.

FIG. 8B depicts the same test conditions, repeated using temperature compensation in the form of an unstrained gage subtraction. As described in the above-incorporated '296 application, a strain gage similar to those mounted on the flexible beams is mounted on an unstressed member of the sensor, and its output is monitored over changes in temperature. FIG. 8 of the '296 application (reproduced here as FIG. 9) depicts a mounting point 35 machined into the TAP 12 of a sensor to receive a strain gage for performing temperature compensation. The output of this unstrained gage is used to compensate the resolved forces and torques, to minimize the influence of strain gage drift over temperature. As FIG. 8B indicates, this compensation improves the Fz performance—making it marginally useful, but still badly out of range, and varying over changes in temperature and also the rate of heating.

FIG. 8C depicts these test conditions again, in which the above quadratic compensation equation is applied to each strain gage prior to combining the gage outputs to resolve the six forces and torques. As FIG. 8C shows, the Fz force output is dramatically stabilized, over all test conditions.

Temperature Compensation Method

Figure 10:
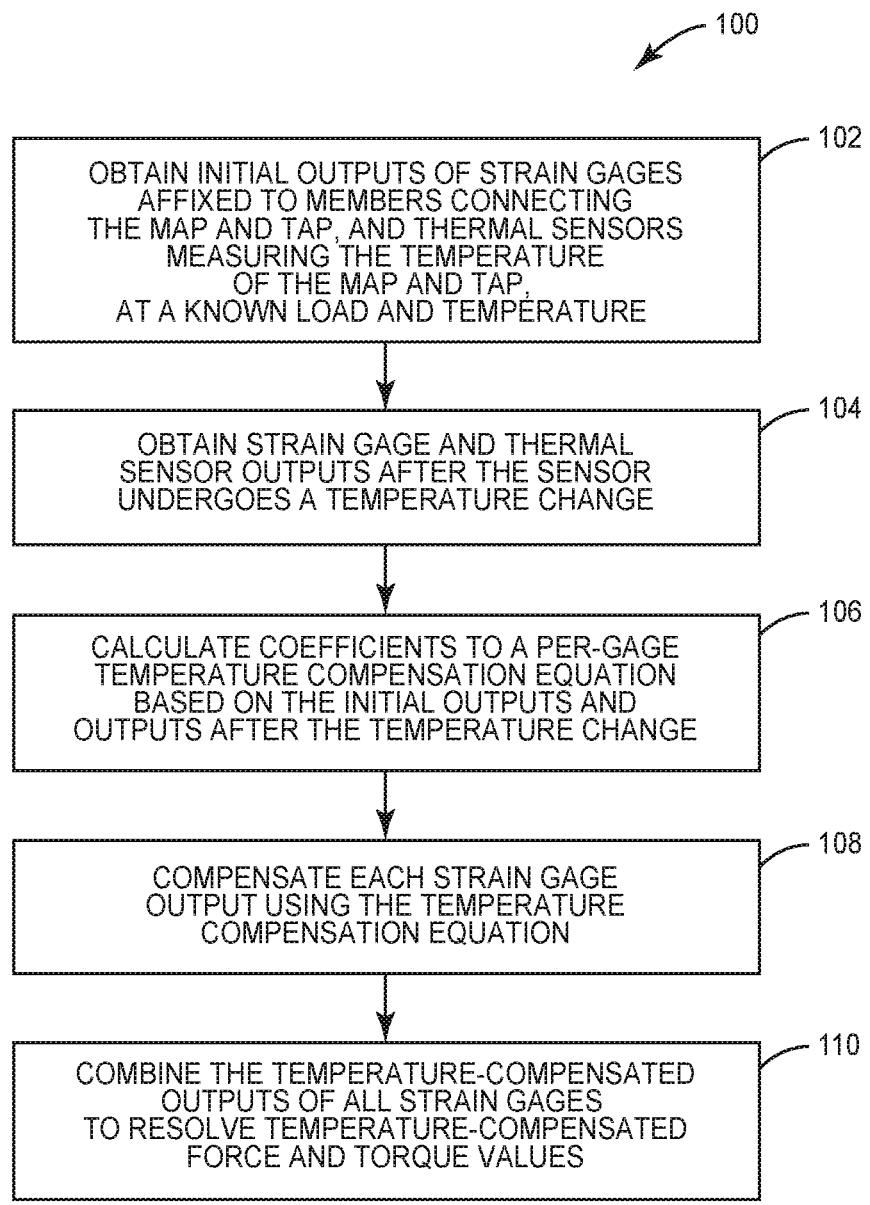
FIG. 10 is a flow diagram of a method of operating a robotic force/torque sensor.

FIG. 10 depicts the steps of a temperature-compensated method 100 of operating a robotic force/torque sensor. The robotic force/torque sensor has a Tool Adapter Plate (TAP) operative to be connected to a first object and a Mounting Adapter Plate (MAP) operative to be connected to a second object. The force/torque sensor is operative to measure the direction and magnitude of force and torque between the first and second objects. Thermal sensors are attached to the force/torque sensor, measuring at least the MAP and TAP temperatures. Details of thermal sensor mounting are attached hereto as Appendix C.

Initially, outputs of strain gages affixed to members connecting the MAP and TAP, and thermal sensors measuring the temperature of the MAP and TAP, are obtained at a known load and temperature (block 102). For example, the sensor may be at 22° C., with no load applied (or a nominal load, such as the weight of a robotic tool attached to the force/torque sensor). The robotic force/torque sensor then undergoes a change in temperature, such as by applying heat in a calibration procedure, or through operation, as electronics and the like become exothermic. Strain gage and thermal sensor outputs are again obtained after the sensor undergoes the temperature change (block 104). This step may be repeated several times, as the sensor temperature and/or loading changes. Coefficients to a per-gage temperature compensation equation are calculated, based on the initial gage/thermal sensor outputs and the same outputs after the temperature change (block 106). In one embodiment, the coefficients are calculated based on a least-squares algorithm, matching the initial and subsequent values to expected outputs. Each strain gage output is then temperature compensated, using the temperature compensation equation (block 108). In one embodiment, the temperature compensation equation may be that described above with reference to Table 1, using quadratic terms for strain gage bias and gain temperature drift, and a linear term for a MAP-TAP temperature gradient. In one embodiment, only the MAP-TAP temperature gradient is used (i.e., the other coefficients are zero). The temperature-compensated outputs of all strain gages are then combined, according to known techniques, to resolve temperature-compensated force and torque values (block 110). For example, the '296 application, incorporated above by reference, describes such force/torque processing.

The method 100 may be supplemented in various ways. For example, the bias and gain of strain gages, independent of force/torque loading, over temperature drift may be accurately estimated by obtaining the output of a strain gage affixed to a non-stressed member of the force/torque sensor. Such an unstressed member strain gage is described in the '296 application, incorporated above by reference.

Transient Temperature Compensation

Temperature compensation according to the first embodiment described above is effective at compensating stable temperature gradients, such as a gradient between MAP and TAP. However, there is a significant amount of strain gage output change during transient gradients. A more sophisticated algorithm may be used to compensate for transient temperature gradients.

In a strain-based force/torque sensor, the goal of transient temperature compensation is to be able to predict the temperature at any given point in the sensing structure. By successfully predicting the temperature distribution throughout the sensing structure, the thermally-induced strains may also be predicted and removed from the measured signals to remove sensitivity of a F/T sensor to all thermal gradients, whether they are steady-state or time-dependent.

Viewed from a differential perspective (similar to how Finite Element Analysis would be performed by breaking F/T sensor element up into many smaller elements), each element of a F/T sensor is part of a thermal circuit. Each element will also induce some erroneous signal output in the F/T sensor's readings when that individual element expands or contracts due to thermal effects. If viewed in matrix form, it can be considered that there is a matrix of temperature changes from the F/T sensor's last bias point where a temperature is recorded for each element. This is referred to herein as the temperature matrix. There is also a matrix of sensitivities that describe the F/T sensor's change in output with respect to each element's temperature, which is referred to herein as the temperature sensitivity matrix. These matrices can be combined as follows, denominated as equation (4):

$$[Temp_1 \cdots Temp_n] = \begin{pmatrix} \text{Sensitivity of Gage 1 to } Temp\ 1 & \cdots & \text{Sensitivity of Gage } m \text{ to } Temp\ n \\ \vdots & \ddots & \vdots \\ \text{Sensitivity of Gage 1 to } Temp\ n & \cdots & \text{Sensitivity of Gage } m \text{ to } Temp\ n \end{pmatrix} = [\text{Gage output 1} \cdots \text{Gage output } m]$$

This is true of any strain-based sensor which has thermal gradients across it. While it is impractical to measure every temperature throughout a physical sensor to perform this exact math, it is practical to design a sensor for the following considerations.

Heat flow is directed by means of insulation or isolation, so its predominant effects are generated along a finite number of paths. If heat flow is not directed along certain paths, then the paths it is allowed to take are routed to areas of the sensing element which have a low sensitivity of relevant gages to temperature changes.

The sensor can be approximated as a finite number of elements, where each element has a constant temperature and a single sensitivity of gages to temperature in this element.

The heat flow through the sensor is governed by the heat equation $$\frac{\partial u}{\partial t} = \propto \nabla^2 u \qquad (5)$$

where u is the temperature as a function of position and time, t is time, x is position, and alpha is the thermal diffusivity of the material. Or, more simply in a 1-D approximation:

$$\frac{\partial u}{\partial t} = \propto \frac{\partial^2 u}{\partial x^2} \qquad (6)$$

Equation (6) can be simplified to the following for a differential element having a sufficiently small width h (this is the $2^{nd}$ order central approximation to the second derivative of the temperature distribution; other approximations may be used instead):

$$\Delta u = \propto \left( \frac{u(x+h) - 2u(x) + u(x-h)}{h^2} \right) \Delta t \qquad (7)$$

It can be seen that at steady-state $$\left( \frac{\partial u}{\partial t} = 0 \right)$$

the second derivative of temperature with respect to position must be zero (assuming no convection, radiation, or internal heat generation), which in turn means that the temperature distribution is simply a straight line across the thermal resistance of the F/T sensor.

Using these two considerations—eq. (7) and the steady-state distribution—it is possible to determine the temperature at any arbitrary point in a F/T sensor at any time, and thus compensate out any erroneous gage signals which are generated by temperature differences across the F/T sensor.

In one embodiment, a single temperature sensor is positioned at either end of a F/T sensor. The sensor is "biased" at a known steady-state condition, so that according to the steady-state behavior described above, the thermal distribution throughout the entire F/T sensor is known at this one point in time, as all points between the two temperature sensors are simply a line between the two measured temperatures. This bias point can be used to initialize n virtual temperature sensors with accurate starting temperatures. From there, steady-state assumptions can be neglected as heatflow through the sensor is governed by the heat equation, which can be approximated at run-time as equation (7). Using equation (7), the propagation of heat through the F/T sensor can be simulated, and should match the actual temperature distribution throughout the F/T sensor to the extent that the assumptions about the F/T sensor are made to be accurate. The temperature distribution throughout the F/T sensor can then be accurately predicted at any time following the initial bias point, and utilized for signal compensation. This equation can also be calibrated on a per-sensor basis to account for variations in the thermal diffusivity of the material, as well as the effective lengths of elements or observed heat losses or additions due to convection, radiation, or internal heat generation.

Once the temperature distribution throughout the entire structure is known at any given time, it is a simple matter subtract out the gage effects observed by the F/T sensor from the sensor's outputs according to equation (4). In addition, the temperature of the gages can be predicted by this method, and any changes in gage behavior due to temperature effects can be canceled out.

Modifications of the heat equation are readily available which account for convection, radiation, and internal heat generation. Those of skill in the art may readily utilize these modifications in this compensation method to provide more accurate results, given the teachings of the present disclosure.

An arbitrary number of temperature sensors may be used with this methodology to characterize heat paths which may not be strictly one-dimensional, or to provide corrections to the 1-D simulation.

Although purely linear equations are described here, it is possible to account for changes in young's modulus, the coefficient of thermal expansion, the thermal diffusivity, and any other properties over temperature, with additional linear terms or the addition of nonlinear terms. Such modification is well within the skill of those of ordinary skill in the art, without undue experimentation, given the teachings herein.

According to this embodiment of temperature compensation, an approximation of the heat equation is used to predict the total temperature distribution in a F/T sensor with a limited input dataset; the derived data is subsequently utilized, in addition to the measured data, to calibrate a F/T sensor using a regression technique such as, e.g., linear least squares, so the F/T sensor output remains stable over temperature changes, whether they are steady-state or transient.

The temperature sensors must be placed so that they observe a temperature change before the temperature change causes a change in output of the F/T sensor, otherwise not all thermal effects can be cancelled out.

As an example, assume a F/T sensor with two strain gages and three virtual temperature sensors:

$[G_0 \; G_1] = G$ $[T_{v0} \; T_{v1} \; T_{v2}] = T_v$

If $T_{v0}$ is the temperature of $G_0$ and an actual temperature sensor $T_2$ (independent of the three virtual temperature sensors) is the temperature of $G_1$, then the compensation equations (2) for the two gages are:

$$G_0 = C_0 G_0 + C_1 T_{v0} + C_2 T_{v0}^2 + C_3 G_0 T_0 + C_4 G_0 T_0^2 + C_5 (T_{map} - T_{tap}) + C_6 + C_7 T_{v0} + C_8 T_{v1} + C_9 T_{v2}$$

$$G_1 = C_{10} G_1 + C_{11} T_2 + C_{12} T_2^2 + C_{13} G_1 T_2 + C_{14} G_1 T_2^2 + C_{15} (T_{map} - T_{tap}) + C_{16} + C_{17} T_2 + C_{18} T_2 + C_{19} T_2$$

The last three terms in each gage compensation equation represent the subtraction of the transient effects according to equation (4) (note that, in the equation for $G_0$, the terms $C_1 T_{v0}$ and $C_7 T_{v0}$ are redundant).

Hence, a modified version of the compensation equation (2), which accounts for transient temperatures, is:

$$G_{n\text{-}comp} = C_0 G_n + C_1 T_n + C_2 T_n^2 + C_3 G_n T_n + C_4 G_n T_n^2 + C_5 (T_{map} - T_{tap}) + C_6 1 + G_{n\text{-}transient} \quad (8)$$

where the last $G_{n\text{-}transient}$ is a matrix of compensation terms for the virtual temperature sensors, derived from equation (4). Another way of expressing equation (8) is thus:

$$G_{n\text{-}comp} = C_0 G_n + C_1 T_n + C_2 T_n^2 + C_3 G_n T_n + C_4 G_n T_n^2 + C_5 (T_{map} - T_{tap}) + C_6 1 + C_7 T_{v0} + \ldots + C_{m+7} T_{vm}$$

where m is the number of virtual temperature sensors simulated by the heat equation model.

Advantages of Embodiments of the Invention

Embodiments of the present invention present numerous advantages over robotic force/torque sensors known in the prior art. By providing temperature compensation, the deleterious effects of temperature change, such as changes in strain gage resistance and gain, may be mitigated. In some embodiments, this enables the use of silicon strain gages, which are well suited to robotic force/torque sensor application, but for the significant temperature-induced errors. On some force/torque sensors, only two thermal sensors are required, as compensating only for the MAP-TAP thermal gradient gives good results. In other applications, thermal sensors placed proximate measurement strain gages provide additional compensation terms, more accurately removing thermal effects from the resolved force/torque measurements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A temperature-compensated method of operating a robotic force/torque sensor having a Tool Adapter Plate (TAP) operative to be connected to a first object and a Mounting Adapter Plate (MAP) operative to be connected to a second object, the force/torque sensor being operative to measure the direction and magnitude of force and torque between the first and second objects, the method comprising:

obtaining initial outputs of strain gages affixed to members connecting the MAP and TAP and thermal sensors measuring the temperature of the MAP and TAP, at a known load and temperature;

obtaining strain gage and thermal sensor outputs after the sensor undergoes a temperature change;

calculating coefficients to a per-gage temperature compensation equation based on the initial outputs and outputs after the temperature change;

compensating each strain gage output using the temperature compensation equation; and combining the temperature-compensated outputs of all strain gages to resolve temperature-compensated force and torque values.

2. The method of claim 1 wherein:

the thermal sensors measure a thermal gradient between the MAP and TAP of the robotic force/torque sensor; and the per-gage temperature compensation equation includes a term representing the MAP-TAP thermal gradient.

3. The method of claim 2 wherein the MAP-TAP thermal gradient term is linear.

4. The method of claim 1 wherein the per-gage temperature compensation equation includes terms representing the temperature of each strain gage.

5. The method of claim 4 wherein the robotic force/torque sensor further includes thermal sensors proximate one or more strain gages, and wherein the thermal sensors indicate the temperature of each strain gage.

6. The method of claim 4 wherein strain gages are connected in a half-bridge or full-bridge circuit topology, and wherein the temperatures of strain gages in each half-bridge or full-bridge circuit are derived from the relationship of current and voltage at the bridge circuit.

7. The method of claim 6 wherein the average temperature of strain gages in a bridge circuit is given by:

$$\text{Temp}_{avg} = C0*V + C1*V^2 + C2*V^3 + C3*I + C4*I^2 + C5*V*I + C6*V*I^2 + C7$$

where V is the voltage output of the half-bridge or full-bridge circuit, and

I is the current through the half-bridge or full-bridge circuit.

8. The method of claim 4 wherein the per-gage temperature compensation equation includes terms representing a change in resistance of a strain gage over temperature and a change in gain of a strain gage over temperature.

9. The method of claim 4 wherein the terms in the per-gage temperature compensation equation representing a change in resistance of a strain gage over temperature and a change in gain of a strain gage over temperature are linear.

10. The method of claim 4 wherein the terms in the per-gage temperature compensation equation representing a change in resistance of a strain gage over temperature and a change in gain of a strain gage over temperature are quadratic.

11. The method of claim 1 wherein the per-gage temperature compensation equation is $$G_{n\text{-}compensated} = C_0 * G_n + C_1 * T_n + C_2 * T_n^2 + C_3 * G_n * T_n + C_4 * G_n * T_n^2 + C_5 * (T_{map} - T_{tap}) + C_6 * 1$$

where $G_a$ is the gage reading, $T_n$ is the temperature of the gage, $T_{map}$ is the temperature of the MAP, and $T_{tap}$ is the temperature of the TAP.

12. The method of claim 1 wherein calculating coefficients to a per-gage temperature compensation equation based on the initial outputs and outputs after the sensor undergoes a temperature change comprises calculating the coefficients using a least squares algorithm.

13. The method of claim 1 further comprising:
obtaining outputs from a strain gage and associated thermal sensor mounted on an unstressed sensor member; and
using the unstressed outputs to track gage outputs over temperature, independently of loading.

14. The method of claim 1 wherein the strain gages are silicon gages.

15. The method of claim 1 wherein the thermal sensors are thermistors.

16. The method of claim 11 wherein the per-gage temperature compensation equation further includes a matrix of terms associated with virtual temperature sensors, which account for transient temperatures.

17. The method of claim 16 wherein the matrix of terms associated with virtual temperature sensors comprises:

$$[Temp_1 \cdots Temp_n] = \begin{pmatrix} \text{Sensitivity of Gage 1 to } Temp\ 1 & \cdots & \text{Sensitivity of Gage } m \text{ to } Temp\ n \\ \vdots & \ddots & \vdots \\ \text{Sensitivity of Gage 1 to } Temp\ n & \cdots & \text{Sensitivity of Gage } m \text{ to } Temp\ n \end{pmatrix} = [\text{Gage output 1} \cdots \text{Gage output } m]$$

18. A temperature-compensated robotic force/torque sensor comprising:
a Tool Adapter Plate (TAP) operative to be connected to a first object;
a Mounting Adapter Plate (MAP) operative to be connected to a second object;
one or more deformable beams connecting the TAP to the MAP;
at least one strain gage affixed to at least one side of each beam, the strain gages operative to transduce tensile and compressive forces on a surface of a side of a beam, caused by deformation of the beam, into electrical signals;
a first thermal sensor affixed to the TAP;
a second thermal sensor affixed to the MAP; and
a measurement circuit operative to measure, in response to electrical signals from all strain gages and temperature outputs from all thermal sensors, the temperature-compensated direction and magnitude of force and torque between the first and second objects.

19. The robotic force/torque sensor of claim 18, further comprising a thermal sensor affixed proximate each strain gage.

20. The robotic force/torque sensor of claim 18 wherein the strain gages are silicon gages.

21. The robotic force/torque sensor of claim 18 wherein the thermal sensors are thermistors.

22. The robotic force/torque sensor of claim 18 further comprising a strain gage and thermal sensor mounted on an unstressed sensor member.

23. The robotic force/torque sensor of claim 18 further comprising a circuit operative to:
calculate coefficients to a per-gage temperature compensation equation based on initial strain gage and thermal sensor outputs before and after the force/torque sensor undergoes a temperature change;
compensate each strain gage output using the temperature compensation equation; and
combine the temperature-compensated outputs of all strain gages to resolve temperature-compensated force and torque values.

24. The robotic force/torque sensor of claim 23 wherein the per-gage temperature compensation equation includes a term representing the MAP-TAP thermal gradient.

25. The robotic force/torque sensor of claim 24 wherein the MAP-TAP thermal gradient term is linear.

26. The robotic force/torque sensor of claim 18 wherein the per-gage temperature compensation equation includes terms representing the temperature of each strain gage.

27. The robotic force/torque sensor of claim 26 wherein the robotic force/torque sensor further includes thermal sensors proximate one or more strain gages, and wherein the thermal sensors indicate the temperature of each strain gage.

28. The robotic force/torque sensor of claim 26 wherein strain gages are connected in a half-bridge or full-bridge circuit topology, and wherein the temperatures of strain gages in each half-bridge or full-bridge circuit are derived from the relationship of current and voltage at the bridge circuit.

29. The robotic force/torque sensor of claim 28 wherein the average temperature of strain gages in a bridge circuit is given by:

$$Temp_{avg} = C0*V + C1*V^2 + C2*V^3 + C3*I + C4*I^2 + C5*V*I + C6*V*I^2 + C7$$

where V is the voltage output of the half-bridge or full-bridge circuit, and

I is the current through the half-bridge or full-bridge circuit.

30. The robotic force/torque sensor of claim 26 wherein the per-gage temperature compensation equation includes terms representing a change in resistance of a strain gage over temperature and a change in gain of a strain gage over temperature.

31. The robotic force/torque sensor of claim 26 wherein the terms in the per-gage temperature compensation equation representing a change in resistance of a strain gage over temperature and a change in gain of a strain gage over temperature are linear.

32. The robotic force/torque sensor of claim 26 wherein the terms in the per-gage temperature compensation equation representing a change in resistance of a strain gage over temperature and a change in gain of a strain gage over temperature are quadratic.

33. The robotic force/torque sensor of claim 18 wherein the per-gage temperature compensation equation is $$G_{n-compensated} = C_0*G_n + C_1*T_n + C_2*T_n^2 + C_3*G_n*T_n + C_4*G_n*T_n^2 + C_5*(T_{map} - T_{tap}) + C_6*1$$

where $G_n$ is the gage reading, $T_n$ is the temperature of the gage, $T_{map}$ is the temperature of the MAP, and $T_{tap}$ is the temperature of the TAP.

34. The method of claim 33 wherein the per-gage temperature compensation equation further includes a matrix of terms associated with virtual temperature sensors, which account for transient temperatures.

35. The method of claim 34 wherein the matrix of terms associated with virtual temperature sensors comprises:

$$[Temp_1 \cdots Temp_n] = \begin{pmatrix} \text{Sensitivity of Gage 1 to } Temp\ 1 & \cdots & \text{Sensitivity of Gage } m \text{ to } Temp\ n \\ \vdots & \ddots & \vdots \\ \text{Sensitivity of Gage 1 to } Temp\ n & \cdots & \text{Sensitivity of Gage } m \text{ to } Temp\ n \end{pmatrix} = [\text{Gage output 1} \cdots \text{Gage output } m]$$

36. A temperature-compensated method of operating a robotic force/torque (F/T) sensor having a body with a plurality of strain gages affixed to the body, and operative to measure the direction and magnitude of force and torque between first and second objects attached to the F/T sensor, the method comprising:
- obtaining initial outputs of a plurality of thermal sensors affixed to the body at first known temperatures and with a known applied load;
- in response to the initial thermal sensor outputs, modeling a temperature gradient across the F/T sensor body;
- during operation, modeling heat flow through the F/T sensor body by a heat equation, and deriving temperatures of a plurality of points on the F/T sensor body based on the modeled heat flow;
- obtaining strain gage outputs as loads are applied to the F/T sensor; and
- compensating each strain gage output for thermal effects using the derived temperatures of the plurality of points on the F/T sensor body based on the modeled heat flow; and
- combining the temperature-compensated outputs of all strain gages to resolve temperature-compensated force and torque values.

37. The method of claim 36, wherein the heat equation is $$\Delta u = \propto \left( \frac{u(x+h) - 2u(x) + u(x-h)}{h^2} \right) \Delta t$$

where
u is the temperature as a function of position and time;
t is time,
x is position,
h is the width of a differential element, and
alpha is the thermal diffusivity of the F/T sensor body.

38. The method of claim 32 wherein compensating each strain gage output for thermal effects using the derived temperature of each associated virtual thermal sensor comprises calculating, for each strain gage, $$G_{n\text{-}comp} = C_0 G_n + C_1 T_n + C_2 T_n^2 + C_3 G_n T_n + C_4 G_n T_n^2 + C_5 (T_{map} - T_{tap}) + C_6 1 + G_{n\text{-}transient}$$

where $G_n$ is the gage reading,
$T_n$ is the temperature of the gage,
$T_{map}$ is the temperature of the MAP,
$T_{tap}$ is the temperature of the TAP, and
$G_{n\text{-}transient}$ is a matrix of compensation terms associated with the plurality of points on the F/T sensor body based on the modeled heat flow.

39. The method of claim 38 wherein the matrix $G_{n\text{-}transient}$ is given by $$[Temp_1 \cdots Temp_n] = \begin{pmatrix} \text{Sensitivity of Gage 1 to } Temp\ 1 & \cdots & \text{Sensitivity of Gage } m \text{ to } Temp\ n \\ \vdots & \ddots & \vdots \\ \text{Sensitivity of Gage 1 to } Temp\ n & \cdots & \text{Sensitivity of Gage } m \text{ to } Temp\ n \end{pmatrix} = [\text{Gage output 1} \cdots \text{Gage output } m]$$

40. The method of claim 32 wherein compensating each strain gage output for thermal effects using the derived temperature of each associated virtual thermal sensor comprises calculating, for each strain gage, $$G_{n\text{-}comp} = C_0 G_n + C_1 T_n + C_2 T_n^2 + C_3 G_n T_n + C_4 G_n T_n^2 + C_5 (T_{map} - T_{tap}) + C_6 1 + C_7 T_{v0} + \ldots + C_{m+7} T_{vm}$$

where $G_n$ is the gage reading,
$T_n$ is the temperature of the gage,
$T_{map}$ is the temperature of the MAP,
$T_{tap}$ is the temperature of the TAP, and
m is the number of virtual temperature sensors simulated by the heat equation model.

* * * * *